Figure 1:
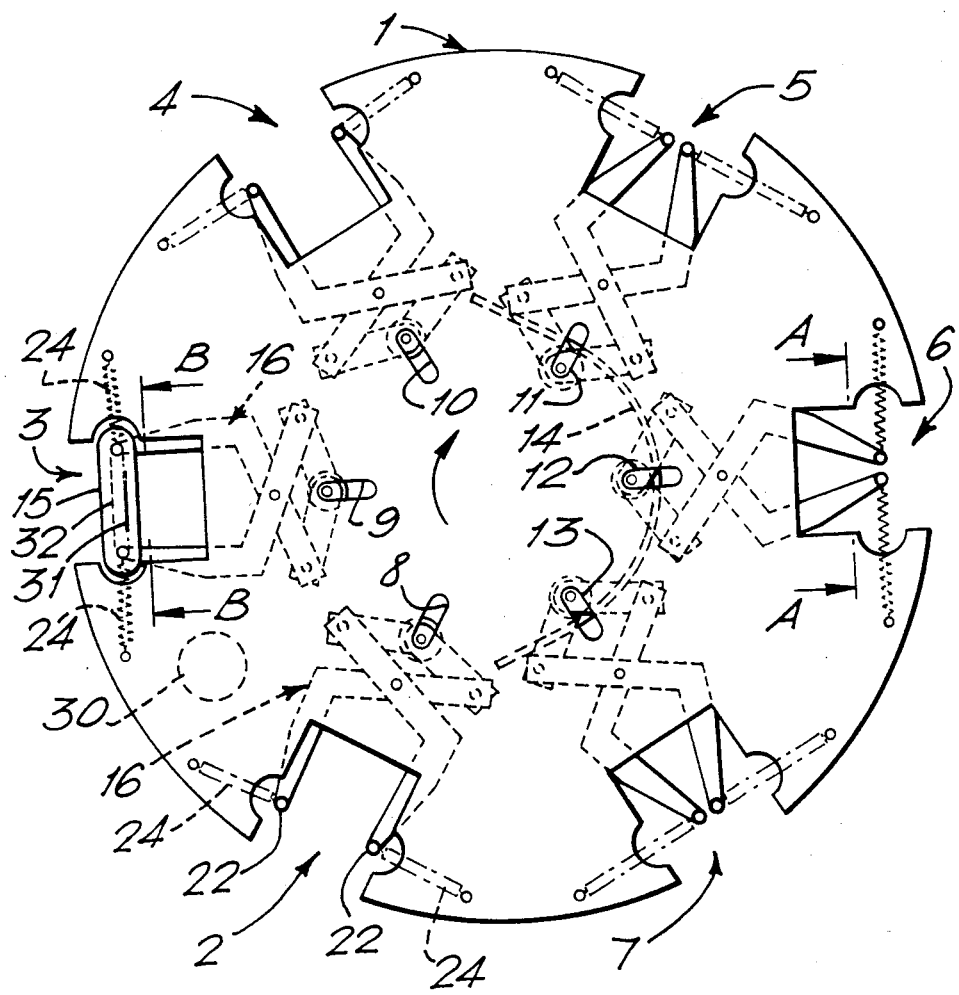

United States Patent [19]

Olsson

[11] Patent Number: 4,545,092
[45] Date of Patent: Oct. 8, 1985

[54] SQUID TRIMMING APPARATUS

[75] Inventor: Sven Olsson, Hälsingborg, Sweden

[73] Assignee: Nestec S.A., Vevey, Switzerland

[21] Appl. No.: 558,484

[22] Filed: Dec. 6, 1983

[30] Foreign Application Priority Data

Aug. 25, 1983 [EP] European Pat. Off. ......... 83108359.7

[51] Int. Cl.⁴ ............................................. A22C 29/02
[52] U.S. Cl. ............................................. 17/71; 17/70
[58] Field of Search .................. 17/53, 71, 74, 24, 70; 198/651, 652, 653, 695, 696

[56] References Cited

U.S. PATENT DOCUMENTS

| | | | |
|---|---|---|---|
| 928,172 | 7/1909 | Bernardin | 198/651 X |
| 4,199,183 | 4/1980 | Hecker | 198/696 X |
| 4,329,761 | 5/1982 | Olsson | 17/71 |

Primary Examiner—Willie G. Abercrombie
Attorney, Agent, or Firm—Vogt & O'Donnell

[57] ABSTRACT

An apparatus for the mechanical trimming of molluscs, especially squid, comprising
(a) a station for attachment of the squid to holding means for holding it during the trimming;
(b) a station having cutting means for cutting the tentacles of the squid, leaving its head;
(c) a station having a cutter for loosening the viscera of the squid from its mantle wall, and with gripping means for gripping and extracting the head of the squid with its associated viscera from the mantle;
(d) a station having means for removing at least part of the tissue on the inside part of the mantle located above the pen in the squid;
(e) a station having gripping means for gripping and extracting the pen from the mantle, and optionally
(f) a station having a device for removing the trimmed mantle from the holding means and transport of the mantle for further treatment; and
(g) means for transporting the holding means with the squid successively through the stations (a)–(f) and for returning the holding means to the station (a) for receiving a new squid characterized in that the holding means consists of a pair of holding pins each pin mounted on one of a pair of spring-loaded pivoted arms biassed to the open position.

9 Claims, 4 Drawing Figures

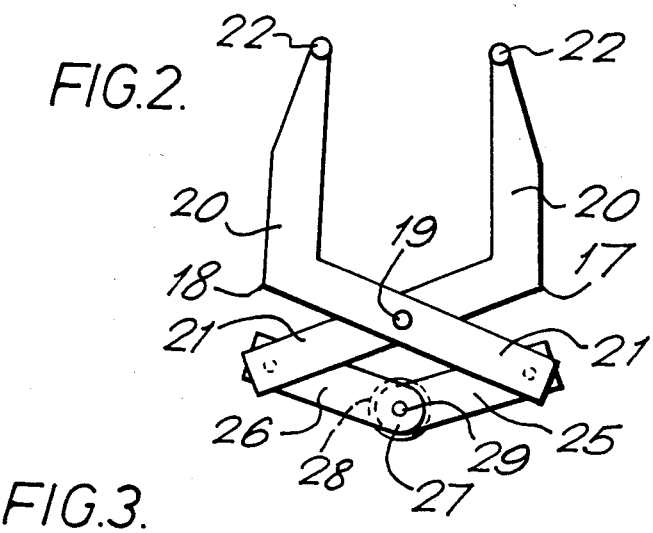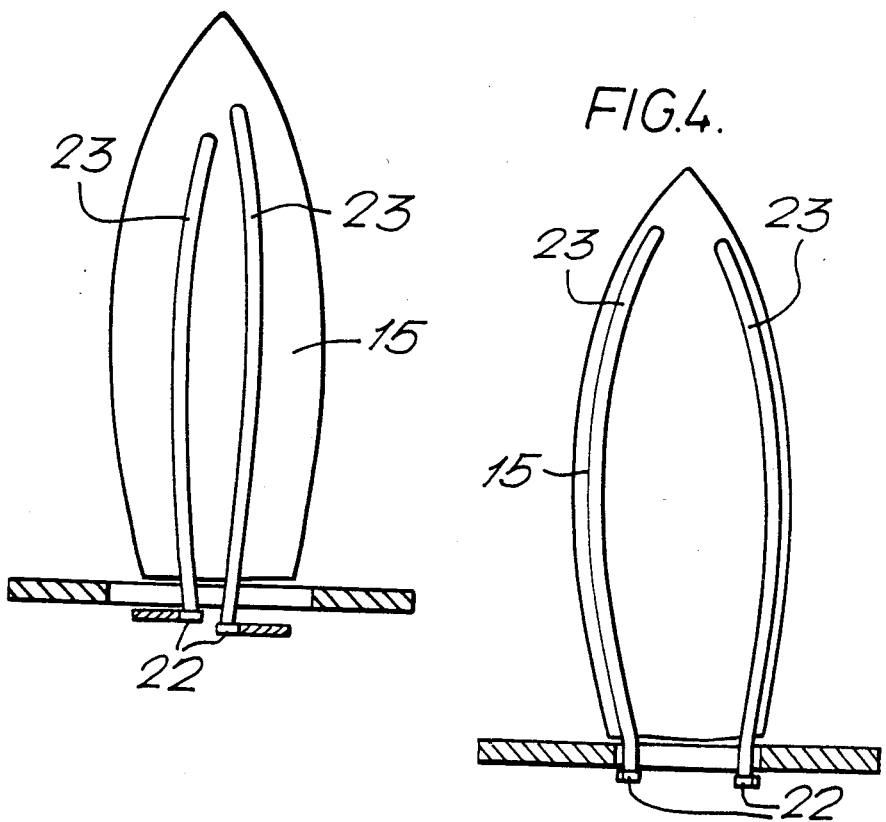

SQUID TRIMMING APPARATUS

This invention relates to an apparatus for trimming molluscs, especially squid.

The squid or cuttlefish (*Loligo vulgaris, Sepia officinalis, Todarodeo Sagittatus* and other species) is a foodstuff much appreciated in many countries.

The squid is built of a fusiform trunk or mantle, which is provided with two longitudinal fins or "wings", and encloses the internal organs, such as the digestive system, inksack, gills, etc. The internal organs end in the head with the ten arms or tentacles, two of which are longer than the others. The rudimentary shell or "pen", which usually consists of a fusiform disc of chitin, at times with lime deposits, is enbedded in the mantle wall. The viscera are attached to the interior mantle wall alongside it at the place where the pen is embedded, but are otherwise relatively loose from the mantle.

The parts of the cuttlefish usually eaten consists of the mantle and sometimes the tentacles. For the preparation of squid for consumption, it is thus necessary to remove the head and viscera and the pen from the mantle, and if it is desired to utilize the tentacles, also to separate these from the head. The wings and a thin surface skin covering the outside of the mantle are usually also removed from the trimmed mantle.

The trimming of squid in the production of squid rings is rather difficult and must be carried out in several steps. The head with its associated viscera must first be loosened from the inside of the mantle and then be pulled out from the mantle, after which the pen is removed. This may often be difficult, as the pen is embedded in the muscle tissue of the mantle wall, which is sometimes rather tough. If the tentacles are to be utilized, they are usually severed from the head before this has been removed from the mantle. For these reasons, trimming of squid has so far mostly been carried out manually, which will be uneconomical when large amounts are handled. It is clear that there would be great advantages in respect of economy and personnel if trimming of squid could be done mechanically as much as possible.

U.S. Pat. No. 4,329,761 describes and claims an apparatus for the mechanical trimming of molluscs, especially squid, characterized in that it comprises (a) a station for attachment of the squid to holding means for holding it during the trimming;

(b) a station having cutting means for cutting the tentacles of the squid, leaving its head;

(c) a station having a cutter for loosening the viscera of the squid from its mantle wall, and with gripping means for gripping and extracting the head of the squid with its associated viscera from the mantle;

(d) a station having means for removing at least part of the tissue on the inside part of the mantle located above the pen in the squid;

(e) a station having gripping means for gripping and extracting the pen from the mantle, and optionally (f) a station having a device for removing the trimmed mantle from the holding means and transport of the mantle for further treatment; and (g) means for transporting the holding means with the squid successively through the stations (a)–(f) and for returning the holding means to the station (a) for receiving a new squid.

In a described embodiment the holding means consists of a U-shaped device for introduction into the mantle of the squid in such a way that the two prongs of the U are inside the mantle and rest against it on each side of the pen.

As squid can vary considerably in size from the average having a length of about 20–30 cm to the considerably larger Norwegian squid (todarodes Sagittatus), the dimensions of the working parts of the apparatus including the holding means have to be adapted to the size of the squid to be trated. We have now developed a novel holding device which can handle not only these large sized squid but, in addition, can be easily adapted to handle the smaller sized squid. Moreover, the new design has a significant advantage in that it enables the very precise positioning of the inside of the tube in relation to the knife that cuts off the viscera and, because of this, the apparatus is to a certain extent independent of the size variations of the squid raw material.

According to the present invention there is provided an apparatus for the mechanical trimming of molluscs, especially squid, comprising (a) a station for attachment of the squid to holding means for holding it during the trimming;

(b) a station having cutting means for cutting the tentacles of the squid, leaving its head;

(c) a station having a cutter for loosening the viscera of the squid from its mantle wall, and with gripping means for gripping and extracting the head of the squid with its associated viscera from the mantle;

(d) a station having means for removing at least part of the tissue on the inside part of the mantle located above the pen in the squid;

(e) a station having gripping means for gripping and extracting the pen from the mantle, and optionally (f) a station having a device for removing the trimmed mantle from the holding means and transport of the mantle for further treatment; and (g) means for transporting the holding means with the squid successively through the stations (a)–(f) and for returning the holding means to the station (a) for receiving a new squid characterised in that the holding means consists of a pair of holding pins each pin mounted on one of a pair of spring-loaded pivoted arms biassed to the open position. Preferably, one holding pin is a little longer than the other as this arrangement makes it easier to attach the squid body to the holding means.

The holding pins which are conveniently flexibly mounted, are preferably removable so that the holding means can be applied to different sized squids by mounting holding pins of the appropriate size and shape on the pivoted arms. The holding pins may be made of any material suitable for handling foodstuffs in a moist environment e.g. a plastics material, but they are preferably made of stainless steel.

The holding pins are suitably mounted at the extremities of the pivoted arms and are conveniently positioned substantially parallel to one another. The pivoted arms may be spring-loaded by any conventional means e.g. a metal spring or a rubber ring.

In a preferred embodiment of the invention, the various treatment stations are arranged in a circular array and the holding means with the squid is successively transported stepwise to each of the stations. After a squid has been trimmed, the holding means has in this way been returned to the starting position, and a new treatment cycle can be started.

Apart from the novel holding means the apparatus is similar to that described and claimed in U.S. Pat. No. 4,329,761.

This invention is further described by way of example only by reference to the accompanying drawings in which FIG. 1 is a schematic top view of an apparatus according to the invention, FIG. 2 is a schematic view of a holding means, FIG. 3 is a lateral sectional view of a squid tube along the line A—A of FIG. 1 and FIG. 4 is similar view along the line B—B of FIG. 1.

The apparatus comprises a rotating table 1 having equally spaced apertures 2-7 close to the periphery and radial slots 8-13. A fixed guide rail 14 is positioned underneath the table. A squid 15 is attached to a holding means 16 so that it is positioned above the table 1. The holding means 16, which for simplicity is described with reference to FIG. 2 and to the position of aperture 2 of FIG. 1, consists of a pair of pivoted arms 17, 18 pivoted and attached to the underside of the table 1 at 19. Each arm comprises a jaw 20 and a shaft 21. The free end of each jaw 20 is provided with an opening 22 in which is mounted a holding pin 23 protruding vertically through the aperture 2 in the table. The jaws 20 are biassed apart by tension springs 24 extending between the free ends of the jaws and the table 1. Pivotally attached to the free end of each shaft 21 are a pair of levers 25, 26 themselves slidably pivoted at 27 which pivot is provided with a downwardly extending stud 28 and an upwardly extending pin 29 which projects into the radial slot 8 at the circumferential end. One holding means is provided for each aperture.

Underneath the table 1, the various treatment stations, which are described in U.S. Pat. No. 4,329,761, are arranged to treat the squid through the apertures. For simplicity, the position of each station is given the same reference numeral as the aperture beneath which the station is shown in FIG. 1. The table 1 is adapted to be rotated so that each aperture is moved one step to the position of the immediately preceding aperture, the holding means 16 with the squid 15 being carried along. In FIG. 1 of the drawings, six apertures are shown and thus each movement comprises 1/6 revolution. This stepwise movement may be achieved by the well-known Geneva drive mechanism or by step motors of various construction.

In operation, the squid 15 is attached to the holding means 16 at station (a) which is located at position 2. The squid is attached so that it hangs with its head downwards on a level with the table with the tentacles hanging down through the aperture 2 in the table. The attachment is preferably carried out manually and the two holding pins 23 are introduced into the squid tube so that they press firmly against the mantle on each side of the position of the mantle where the pen is located. The attachment of the viscera to the mantle wall is between the two holding pins 23. As the squid moves from position 2 to position 3 it is passed by a cutter 30 at station (b) which cuts off the tentacles. In the treatment station (c) at position 3 the viscera are loosened from the mantle wall by a cutting knife 31 which moves vertically upwards in the space between the two holding pins and the mantle. The spring bias of the jaws 20 on which the holding pins are mounted causes the holding pins to press firmly against the mantle and enables the very precise positioning of the inside surface 32 of the tube in relation to the knife. In station (d) at position 4 part of the tissue on the inside part of the mantle wall located above the pen is removed and in station (e) at position 5 the pen is gripped and extracted from the mantle. In passing from position 4 to position 5, the downwardly extending stud 28 contacts the guide rail 14 which causes the pivot 27 to slide towards the centre of the table guided by the pin 29 in the radial slot 11, which in turn causes the jaws 20 to close and enables the squid tube to be released from the holding pins 23. In station (f) at position 6 the trimmed mantle is removed from the holding means. If desired, a new squid can be attached to the holding means at position 7. In passing from position 7 to position 2, the stud 28 leaves the guide rail 14 so that the tension springs 24 cause the jaws to open which in turn causes the pivot 27 to slide towards the circumference of the table guided by the pin 29 moving towards the circumferential end of the radial slot 8. The treatment cycle is then repeated.

By varying the size of the holding pins and adjusting the width and stroke length of the cutting knife, the apparatus will to a certain extent be independent of the size variations in the squid raw material and can be used for cleaning squids of relatively different sizes. In addition, by using the spring-loaded holding pins which can stretch squid tubes of different sizes, a very precise positioning of the inside of the squid tube to the cutter at station (c) is achieved. The materials used for the apparatus are those suitable for use in handling foodstuffs in a moist environment e.g. stainless steel.

It should be realised that the arrangement described in the drawing is not the only possible embodiment. For example, the holding means can be arranged on a conveyor which in part moves intermittently in a straight line and are stopped at the stations of treatment which are also arranged in a straight line, but otherwise act in the same way as described above.

I claim:

1. An apparatus for the mechanical trimming of molluscs, especially squid, comprising
    (a) a station for attachment of the squid to holding means for holding it during the trimming;
    (b) a station having cutting means for cutting the tentacles of the squid, leaving its head;
    (c) a station having a cutter for loosening the viscera of the squid from its mantle wall, and with gripping means for gripping and extracting the head of the squid with its associated viscera from the mantle;
    (d) a station having means for removing at least part of the tissue on the inside part of the mantle located above the pen in the squid;
    (e) a station having gripping means for gripping and extracting the pen from the mantle;
    (f) a station for removal of the trimmed mantle from the holding means; and
    (g) means for transporting the holding means with the squid successively through the stations (a)-(f) and for returning the holding means to the station (a) for receiving a new squid characterised in that the holding means comprises arms pivotally connected to one another and a pair of elongated holding pins, one of said pins being mounted to each of said arms, said pins extending codirectionally with one another from said arms, said arms being movable relative to one another between an open position wherein the pins are remote from one another and a closed position wherein the pins are adjacent one another, said holding means further comprising resilient means for biasing said arms toward said open position, whereby when a squid is mounted on said pins so that the mantle of the squid envelopes the pins, the pins will bear upon the interior of the mantle under the influence of said biasing means.

2. An apparatus according to claim 1 characterised in that the holding pins are removable from the pivoted arms.

3. An apparatus according to claim 1 characterised in that the holding pins are mounted at the extremities of the pivoted arms.

4. An apparatus according to claim 1 characterised in that the holding pins are positioned substantially parallel to one another.

5. An apparatus according to claim 1 characterised in that the holding pins are adapted to be introduced into the squid tube in such a way that they press firmly against the mantle on each side of the pen.

6. An apparatus according to claim 1 characterised in that the stations of treatment (b)–(f) are arranged in a circular form and the holding means with the squid is stepwise successively conveyed to the treatment stations.

7. An apparatus according to claim 1 characterised in that the stations of treatment (b)–(f) and a plurality of holding means are arranged around the circumference of and beneath a rotatable table in which the pairs of pivoted arms of the holding means are attached at the pivots to the underside of the table and wherein apertures are located in the table at the position of each holding means through which apertures the holding pins protrude to hold the squid above the table and the means for treatment at the stations can treat the squid.

8. An apparatus according to claim 1 wherein one of said pins is longer than the other.

9. An apparatus according to claim 1, further comprising means for moving said arms to said closed position and retaining said arms in said closed position when said holding means is at said removal station, said retaining means being operative to permit movement of said arms toward said open position under the influence of said biasing means before the holding means reaches said viscera loosening station.

* * * * *